UNITED STATES PATENT OFFICE.

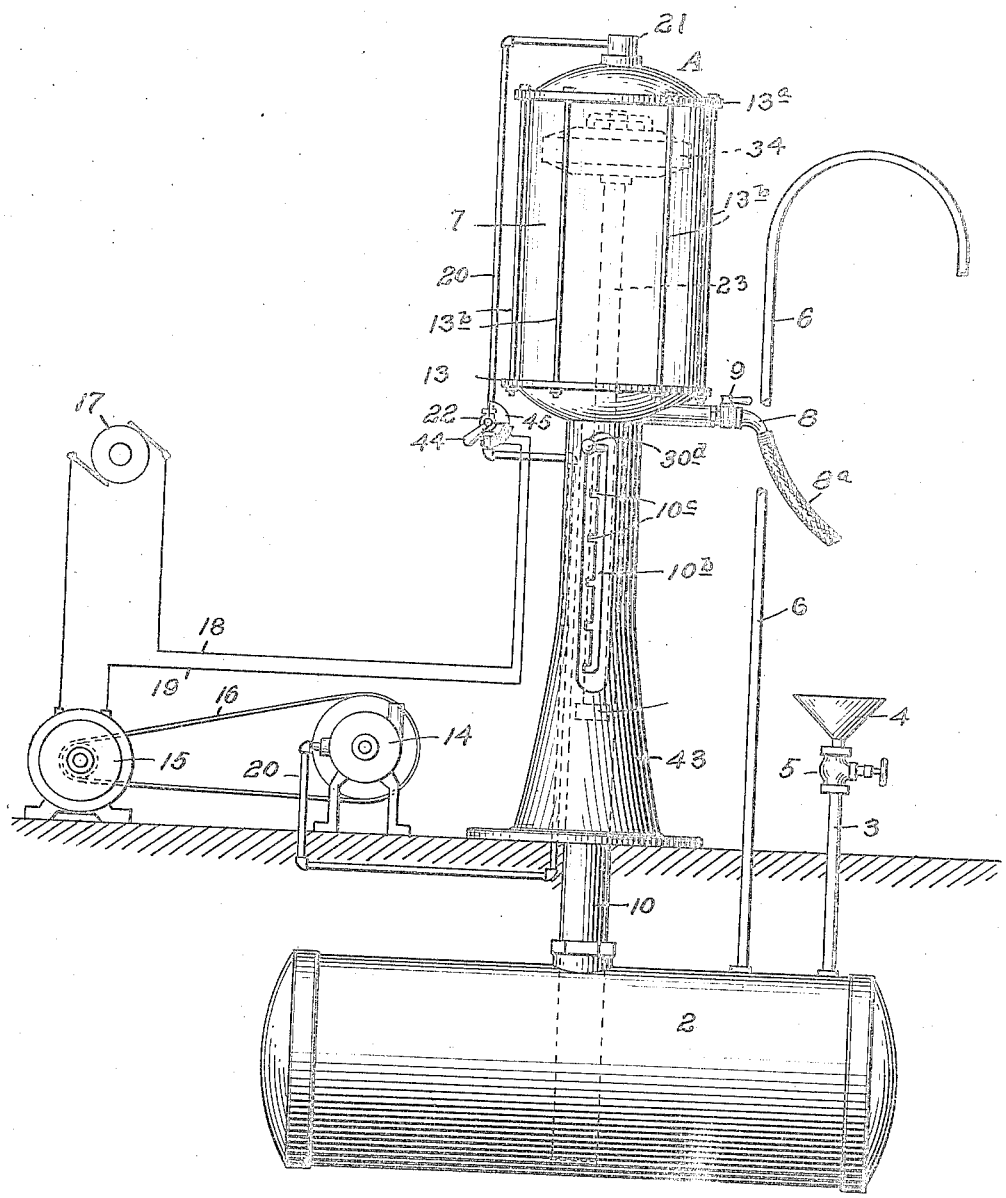

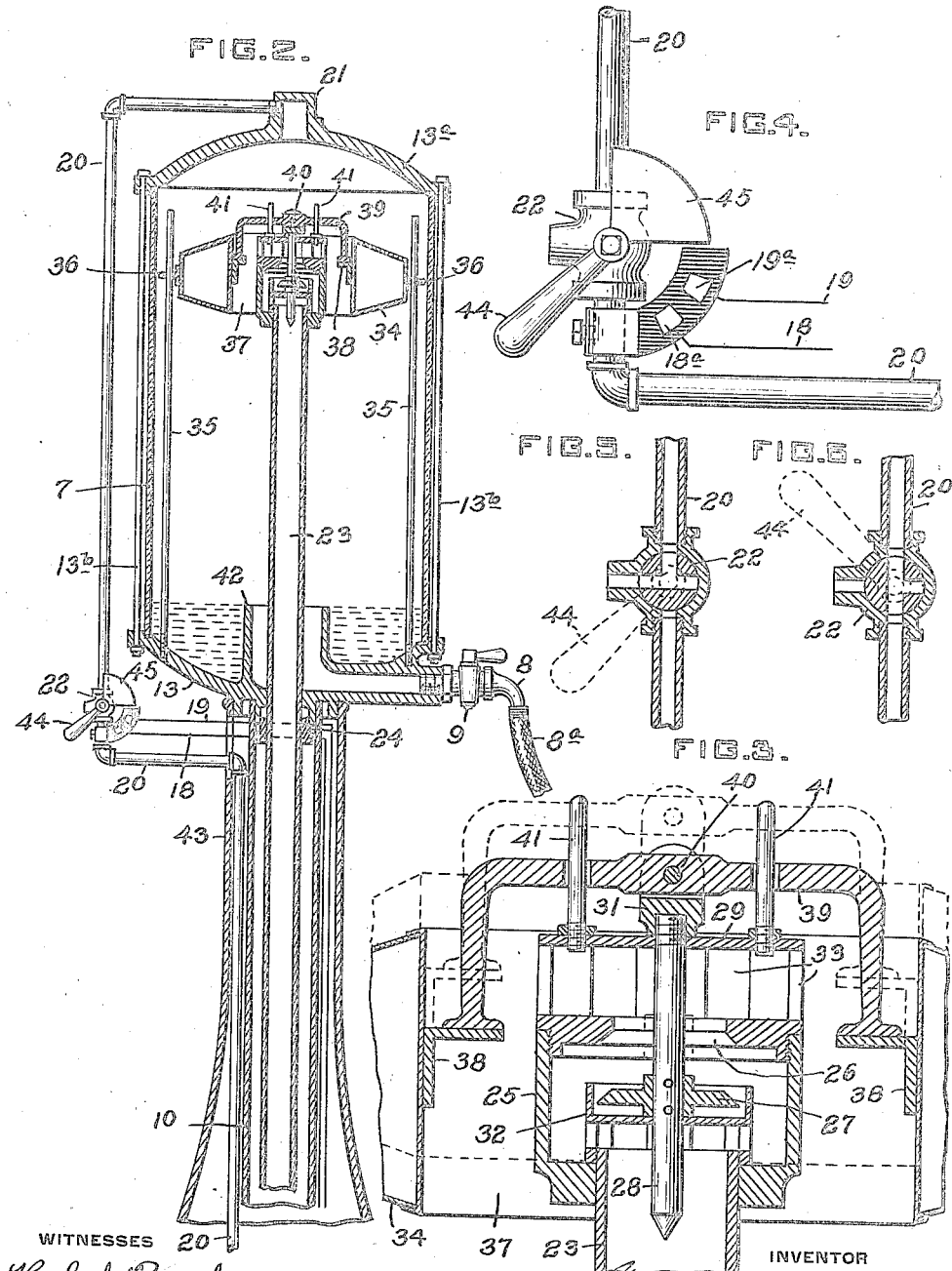

GEORGE W. MacKENZIE, JR., OF ROCHESTER, PENNSYLVANIA, ASSIGNOR TO GUARANTEE LIQUID MEASURE COMPANY, OF ROCHESTER, PENNSYLVANIA, A CORPORATION OF DELAWARE.

LIQUID-MEASURING APPARATUS.

1,255,763.

Specification of Letters Patent.   Patented Feb. 5, 1918.

Application filed October 10, 1916.  Serial No. 124,822.

*To all whom it may concern:*

Be it known that I, GEORGE W. MAC-KENZIE, Jr., a citizen of the United States, residing at Rochester, in the county of Beaver and State of Pennsylvania, have invented certain new and useful Improvements in Liquid-Measuring Apparatus, of which the following is a specification.

My invention consists of an improvement in apparatus for delivering gasolene or other liquids in measured quantities from a measuring or secondary tank connected with the main reservoir at any suitable location, adapted to receive fluid from the main reservoir and to measure the amount to be delivered from the secondary tank to a purchaser or user, as hereinafter described.

The improvement comprised in the present application relates to the valve mechanism for controlling the flow of the fluid into the measuring tank, and the connection and coöperation therewith of a buoyant float adapted to open and close the inlet valve, means for controlling the exhaust conduit for creating a partial vacuum within the measuring tank for simultaneously making and breaking the circuit to the controlling motor of an air-exhausting device, and to various other features of construction and improvement, as shall be more fully hereinafter set forth.

Referring to the drawings illustrating the invention,—

Figure 1 is a general view in elevation, showing the several parts of the apparatus in operative relation.

Fig. 2 is an enlarged vertical sectional detail view, illustrating the improvement, and showing the buoyant float in operative position.

Fig. 3 is a further enlarged sectional detail view of the supply-controlling valve and the coöperating float.

Fig. 4 is a detail view, showing the current-controlling exhaust air valves.

Figs. 5 and 6 are sectional detail views of said valves, showing it open to the atmosphere, and in registering position with the air exhausting device respectively.

Referring to Fig. 1, the primary or storage tank or reservoir 2 is provided with any suitable filling pipe 3 having a funnel 4 and a shut-off cock or valve 5. A relief pipe 6 for admitting and discharging atmospheric air is preferably connected with the upper portion of the tank 2, and may extend to any suitable point thereabove.

The secondary or measuring tank A, which, in the preferred construction, is provided with a cylindrical glass body portion, is located at any desired elevation above the primary tank for delivering fluid to a customer or user through a pipe 8 having a controlling valve 9 and a delivery hose extension 8ª.

A pipe 10 leads from the bottom portion of the measuring tank A to the lower portion of reservoir 2, so as to insure exhausting the contents of the tank, and is in communication with the interior of the measuring tank A through the central vertically adjustable tube 23 adapted to be set at any desired level by the operator.

The secondary or measuring tank A in the present construction consists of a cylindrical shell 7, preferably of glass, clamped between a base 13 and a top 13ª by means of a series of rods 13ᵇ and any suitable intervening packing material, whereby to provide an airtight chamber. The advantage in having the body portion 7 of glass is to insure visibility of the contents.

For the purpose of creating a partial vacuum in the tank A, any suitable air exhausting means may be employed, as a pump 14 of suitable construction connected with a driving motor 15 by belt 16, the motor being actuated by power from a generator 17 by means of suitable conducting wires 18, 19, as will be readily understood, the circuit being adapted to be opened and closed by connecting the terminals 18ª and 19ª.

A suction pipe 20 is connected with the pump 14 and with the upper portion of tank A, as indicated at 21, with an intervening controlling valve 22 adapted to establish suction communication with the pump, as indicated in Fig. 6, and to close such communication and open the interior of the tank to the outside atmosphere, as indicated in Fig. 5.

The operating handle 44 of valve 22 is provided with a circuit closing extension 45 adapted to electrically connect the contacts 18ª and 19ª when passage to the suction pump is open, and to break such electrical connection when the suction connection is closed, as will be readily understood from Figs. 4, 5 and 6. Conduit 23 is adapted to be raised and lowered, and to be partially rotated by means of an operating trigger or handle 30ᵈ which extends outwardly through a vertical slot 10ᵇ in conduit 10, having at predetermined positions, off-set slots, or arresting openings 10ᶜ.

Conduit 23 has a sliding and fluid-tight sealing engagement within the conduit 10 by means of a packed head 24, providing for ample vertical movement of the conduit 23, and preventing flow of the liquid from pipe 10 to the interior of tank A otherwise than through conduit 23.

At its upper end conduit 23 is provided with a valve casing 25 suitably secured to the terminal end of the conduit, having at its upper portion a valve seated opening 26 through which liquid will pass upwardly into the interior of tank A when a co-acting valve 27 is open, as indicated in Fig. 3.

Said valve is mounted upon a stem 28 which extends upwardly through an upper bearing plate 29 of the valve casing, and is connected to a terminal head 31. By this means stem 28 and its valve 27 are vertically movable, stem 28 being likewise guided in a lower bearing in cup 32 spaced upwardly above the upper end of conduit 23. Plate 29 is likewise spaced upwardly beyond the valve seated opening 26, so that when the valve is opened by its gravitating action, free circulation is provided around it and through the opening 26 and spaces 33 thereabove to the interior of the tank A.

A buoyant float 34, which may conveniently be made of sheet metal in hollow circular disk form, is mounted for vertical movement upon guiding rods 35, 35, within measuring tank A, engaging said rods by sliding lugs 36, 36. The central portion of said float is vertically hollow, providing ample clearance space, as indicated at 37, and to the inner walls of the float are secured lugs or abutments 38 adapted, on upward travel of the float, to engage the downwardly extending terminals of a cross arm 39, which is centrally secured, as by a pivot 40 to head 31 of stem 28.

Cross arm 39 is preferably mounted upon upstanding guide pins 41, 41, secured to plate 29 so as to ride freely thereon, either upwardly or downwardly. Delivery pipe 8 communicates through valve 9 with the interior of the measuring tank A, preferably through a central annular upwardly extending shell 42, terminating at any desired level, corresponding to the level within the measuring tank down to which the contents may be quickly drawn off upon reëstablishing atmospheric pressure within the tank.

The measuring tank A is supported upwardly above the ground or other foundation upon a tubular supporting shell 43, within the interior of which are conveniently located suction pipe 20, wires 18 and 19, and the main conduit pipe 10 and adjustable conduit pipe 23.

Column 43 is provided at its front with an elongated opening, as shown in Fig. 1, providing for clearance of the actuating handle 30ᵈ and its manipulation through slot 10ᵇ and into notches 10ᶜ.

The construction and operation of the device will be readily understood from the foregoing description.

Manipulation of valve 22 will simultaneously actuate suction pump 14 and place the conduit 20 in suction communication therewith, and with the interior of the measuring tank A, whereupon liquid will rise through conduits 10 and 23, passing through valve seated opening 26 upwardly against plate 29 which acts as a splash plate, and escaping laterally into the interior.

Handle 30ᵈ having been set at the desired level, thus raising the conduit 23 to a predetermined position, depending upon the amount to be charged into the measuring tank, float 34 will be carried up by the liquid until its lugs 38 engage the downwardly extending terminals of arm 39, whereupon valve 27 will then be lifted, shutting off the flow. The tank being thus filled to the desired height, valve 22 is opened to the atmosphere, at the same time cutting out the pump motor, and terminating action of the pump, whereupon the liquid may then be withdrawn by opening valve 9.

As will be observed, rotation of vertically adjustable conduit 23 by handle 30ᵈ will at the same time rotate the valve cage at the upper end of the conduit, and also arm 39, throwing its terminals into or out of register with flange abutments 38, the operation being to throw these parts in register when arm 39 is thrown into either of the several notches 10ᶜ.

By this means, upon throwing the arm into register with vertical slot 10ᵇ, it may be raised or lowered without interference with abutments 38, irrespective of the position of the float.

The construction and operation of the invention will be readily understood and appreciated from the foregoing description, and is somewhat similar to that set forth in a prior application, Serial No. 53897.

Having described my invention, what I claim is:

1. In combination, a main reservoir, a superimposed measuring tank, a pipe leading from the reservoir to the measuring tank, a vertically movable conduit extending from the measuring tank into the reservoir pipe and having at its upper end an apertured valve casing and a vertically movable opening and closing valve, a buoyant float adapted to coöperate with said valve to close the outlet from the conduit to the interior of the tank, means for locating said conduit at any predetermined position, means for exhausting the air from the measuring tank, and means for drawing off its contents.

2. In an apparatus of the class described, the combination with the measuring tank having an inlet, a valve on said inlet, and means for automatically closing said valve, of a suction conduit provided with a controlling valve adapted to open the interior of the tank to the atmosphere, a suction pump, a motor therefor, and means dependent upon the operation of the valve for controlling said motor.

3. In an apparatus of the class described, the combination with the measuring tank and the vertically adjustable rotatable inlet conduit therefor, of a vertically movable float within the tank provided with abutments, and a flow-controlling valve seated cage on the upper end of the conduit provided with a vertically adjustable valve stem and a lifting arm adapted to be engaged by the abutments of the float.

4. In an apparatus of the class described, the combination with the measuring tank and the vertically adjustable rotatable inlet conduit therefor, of a vertically movable float within the tank provided with abutments, and a flow-controlling valve seated cage on the upper end of the conduit provided with a vertically adjustable valve stem and a lifting arm adapted to be engaged by the abutments of the float, said arm being rotatable with the conduit to throw it into registering position with relation to said abutments.

In testimony whereof I hereunto affix my signature.

GEORGE W. MacKENZIE, Jr.